United States Patent
Krystkowiak et al.

(10) Patent No.: US 7,292,754 B2
(45) Date of Patent: Nov. 6, 2007

(54) COMPENSATING INTERFEROMETER INCLUDING DELAY LINES WITH REDUCED NOISE

(75) Inventors: Joseph Krystkowiak, Moorpark, CA (US); Sanan Shaibani, Woodland Hills, CA (US); Akbar Arab-Sadeghabadi, Simi Valley, CA (US); John Mansell, Thousand Oaks, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 250 days.

(21) Appl. No.: 11/012,850

(22) Filed: Dec. 15, 2004

(65) Prior Publication Data

US 2006/0127008 A1 Jun. 15, 2006

(51) Int. Cl.
*G02B 6/26* (2006.01)
*G02B 6/42* (2006.01)
(52) U.S. Cl. .............................. 385/39; 385/1; 385/31; 385/37; 359/637
(58) Field of Classification Search .................... 385/1, 385/15, 31, 37, 39, 47; 359/637
See application file for complete search history.

(56) References Cited

U.S. PATENT DOCUMENTS

| | | | |
|---|---|---|---|
| 6,310,993 B1 * | 10/2001 | Cao et al. ..................... 385/24 |
| 6,493,088 B1 * | 12/2002 | Hui et al. ..................... 356/450 |
| 6,591,025 B1 * | 7/2003 | Siems et al. ................... 385/12 |
| 7,130,506 B2 * | 10/2006 | Shaibani et al. ............... 385/37 |
| 2001/0048071 A1 | 12/2001 | Holtz et al. |
| 2002/0057866 A1 * | 5/2002 | Hung ........................... 385/24 |
| 2004/0207902 A1 | 10/2004 | Koch et al. |
| 2004/0213501 A1 | 10/2004 | Chi et al. |

FOREIGN PATENT DOCUMENTS

EP 1 432 149 6/2004

* cited by examiner

*Primary Examiner*—Frank G. Font
*Assistant Examiner*—Derek L. Dupuis

(57) ABSTRACT

Methods and apparatus for reducing noise in optical apparatus comprising a delay line by utilizing a plurality of wavelength specific delay lines to delay an input waveform such as a pulse rather than a single delay line. In a preferred embodiment an apparatus is configured to generate an optical waveform by distributing an input optical waveform among a plurality of environmentally isolated legs, wherein each leg contributes to the generated optical waveform by reflecting back at least a portion of light distributed to the leg, and the distribution among the plurality of legs is at least partially wavelength dependent.

13 Claims, 3 Drawing Sheets

COMPENSATING INTERFEROMETER INCLUDING DELAY LINES WITH REDUCED NOISE

FIELD OF THE INVENTION

The present invention relates generally to compensating interferometers, and more particularly to compensating interferometers used to manipulate light signals output by optical sensor arrays.

BACKGROUND OF THE INVENTION

In some instances it is beneficial to utilize an apparatus comprising a compensating interferometer that modulates the phase of an input light signal to produce an output signal that is a superposition of an input signal and a phase shifted version of the input signal. One such instance is when a compensating interferometer is used to manipulate the output of a sensor array as described in U.S. Pat. No. 5,987,197. However, known compensating interferometers lack functionality that can be advantageous in processing optical signals.

SUMMARY OF THE INVENTION

The present invention is directed to methods and apparatus for reducing noise in optical apparatus, such as compensating interferometers, comprising a delay line by utilizing a plurality of wavelength specific delay lines to delay an input waveform such as a pulse rather than a single delay line. In a preferred embodiment an apparatus is configured to generate an optical waveform by distributing an input optical waveform among a plurality of environmentally isolated legs, wherein each leg contributes to the generated optical waveform by reflecting back at least a portion of light distributed to the leg, and the distribution among the plurality of legs is at least partially wavelength dependent.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the Figures thereof and wherein.

DETAILED DESCRIPTION OF THE PREFERRED EMBODIMENTS

Figure 1:
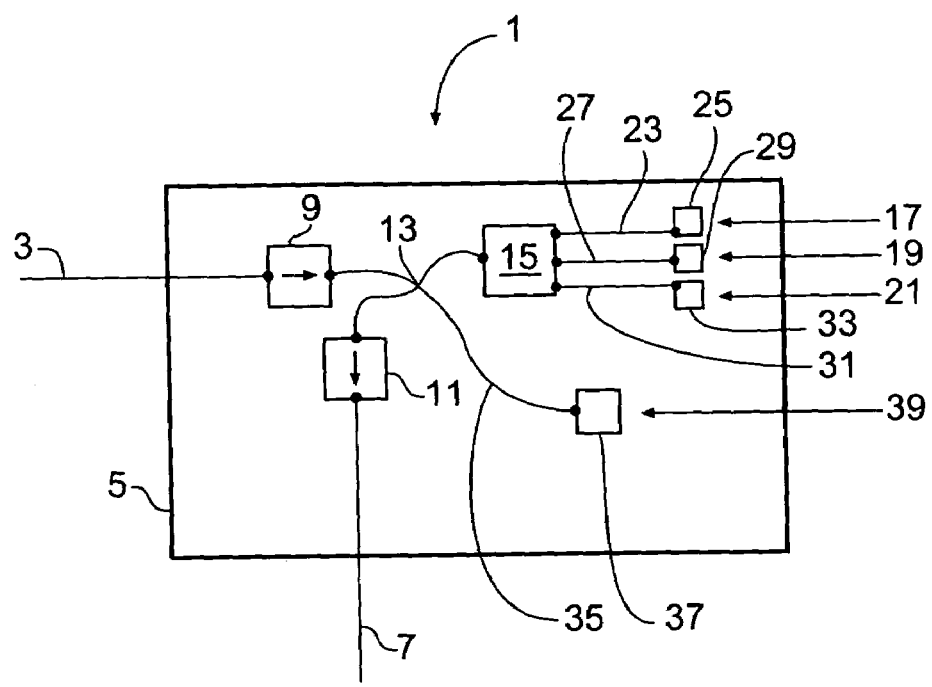
FIG. 1 is schematic view of a first apparatus in accordance with an embodiment of the invention.

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

The apparatus and methods described herein provide means for reducing noise in optical apparatus comprising a delay line by utilizing a plurality of wavelength specific delay lines to delay a pulse rather than a single delay line. As such, prior to transmitting light via a delay line, the light is divided into its component wavelengths, or at least into component signals having a narrower bandwidth than the original signal, and each component wavelength/signal is transmitted through a delay line dedicated to that component. If an apparatus comprises multiple delay lines, the division of light into component wavelengths/signals can be applied to any or all of the delay lines.

As used herein, a "delay line" is any optical path which is sized and dimensioned to insure that light traveling through it travels for a desired amount of time, i.e. that the "time of flight" of light passing through it is equal to a desired value. Of particular interest herein are delay lines that have a time of flight of at least 100 ns. Such delay lines will be referred to herein as "long delay lines". In preferred embodiments, long delay lines will introduce a length of flight of at least 100 ns, and more preferably of at least 200 ns. Delay lines which are not long delay lines may be referred to herein as "short" delay lines.

The apparatus and methods described herein are particularly advantageous when the apparatus is used to provide means for generating and/or modifying input optical pulse trains or other optical waveforms, and/or means for cleaning up or filtering input optical waveforms. More particularly, some embodiments are optical interferometers that utilize multiple internal paths and reflectors such as mirrors and/or Bragg gratings to form one or more desired waveforms from one or more input wave forms. In such apparatus, the internal paths and reflectors may be paired into optical legs where each leg comprises a delay line and at least one reflector such that light entering the leg travels through the delay line, is at least partially reflected, and the reflected light passes back through the delay line. As an example of how such an apparatus may be used to form a desired waveform, in one embodiment, if an optical pulse train is input into an apparatus, a single input pulse of the pulse train is split into two output pulses separated in time and having a fraction of the energy of the input pulse, but otherwise being substantially similar to the input pulse. Other examples of apparatus and methods which can advantageously be combined with the apparatus and methods described herein are found in the inventors' co-pending U.S. patent application Ser. No. 11/012,398, which is titled "Compensating Interferometer With Bragg Reflectors," filed on Dec. 15, 2004 and herein incorporated by reference in its entirety.

FIG. 1 provides a schematic view of an apparatus 1 including an input optical fiber 3, a body 5 and an output optical fiber 7. The input optical fiber 3 is optically coupled to an optical isolator 9 which is optically coupled to a two by two fused fiber coupler 13. Also optically coupled to coupler 13 are wavelength division multiplexer (WDM) 15, leg 39, and optical isolator 11. The isolator 11 is also optically coupled to output optical fiber 7. Leg 39 comprises a length of fiber 35, and a reflector 37. The WDM 15 is optically coupled to legs 17, 19, and 21 comprising optical fibers 23, 27, and 31, and reflectors 25, 29, and 33. The length of fiber 35 is a short delay line and fibers 23, 27, and 31 are long delay lines. As such, the fiber 23, 27, and 31 increase the time of flight of light passing through them to a greater extent than light passing through fiber 35. Delay lines 23, 27, and 31 are sized and dimensioned such that they each introduce an equal amount of delay to light traveling through them. In some instances, it may be advantageous if one or more of the delay lines 23, 27, and 31 introduced a different amount of delay relative to one or more of the other delay lines.

Light input to apparatus 1 via the fiber 3 passes through isolator 9, and is split by coupler 13. A portion of the input light passes through WDM 15 which further splits the light by wavelength, and transmits it into legs 17, 19, and 21 where it is reflected back into WDM 15 and recombined to enter coupler 13. A portion of the input light is also transmitted by coupler 13 into leg 39 which reflects it back to be recombined with the light reflected by legs 17, 19, and 21 in coupler 13. The reflected light pass through coupler 13 at which point isolator 9 prevents the light from being transmitted through input optical fiber 3, but allows it to be transmitted through output optical fiber 7.

Of particular interest are WDM 15 and its relation to legs 17, 19, and 21. It would be possible to replace WDM 15 and legs 17, 19, and 21 with a single leg comprising a broad band reflector. However, in such an instance all the components of the signal passing through the leg would travel via the same path. This has a detrimental effect on the signal output by the apparatus 1. By splitting an optical signal into narrower bandwidth (preferably single wavelength) component signals, and using different delay lines for each component signal, the detrimental effect can be reduced. The reduction in the detrimental effect occurs at least in part as the same coherent, mechanical, and/or thermal noise is not introduced by each delay line.

Figure 2:
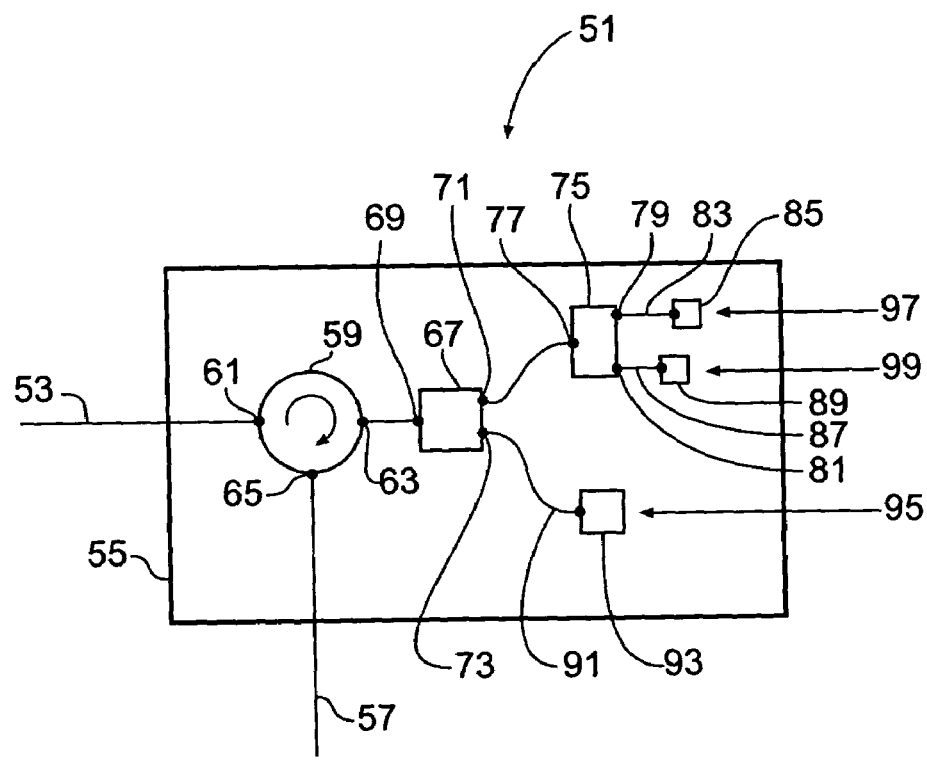
FIG. 2 is a schematic view of a second apparatus in accordance with an embodiment of the invention.

FIG. 2 provides a schematic view of an apparatus 51 including an input optical fiber 53, a body 55 and an output optical fiber 57. Input optical fiber 53 is optically coupled to a first port 61 of a three port circulator 59, and the output optical fiber 57 to the third port 65 of the optical circulator 59. The second port 63 of the optical circulator 59 is optically coupled to a splitter 67. The splitter 67 includes three ports 69, 71, and 73, wherein light traveling into the splitter 67 through the port 69 is split between the ports 71 and 73, and light traveling into the splitter 67 through the ports 71 and 73 is combined and exits the splitter 67 via the port 69 and subsequently exits the apparatus 51 via the third port 65 of the circulator 59 and the output optical fiber 57. Port 71 of splitter 67 is optically coupled to a WDM 75, and port 73 to optical leg 95 comprising short delay line 91 and reflector 93. The WDM 75 includes three ports 77, 79, and 81, wherein light traveling into the WDM 75 through the port 77 is split by wavelength between the ports 79 and 81, and light traveling into the WDM 75 through the ports 79 and 81 is combined and exits the WDM 75 via the port 77, passes through splitter 67, and subsequently exits the apparatus 51 via the circulator 59 and the output optical fiber 57. The ports 79 and 81 are each connected to an optical leg (97, 99) including a length of optical fiber (83, 87) with each length of optical fiber (83, 87) being a delay line optically coupled to one or more reflectors (85, 89) such as mirrors and/or fiber Bragg gratings. The port 79 is connected to the optical leg 97 that includes long delay line 83 comprising and reflector 85, and the port 81 is coupled to the optical leg 99 that includes the long delay line 87 and reflector 89. Long delay lines 83 and 87 may be sized and dimensioned such that the time of flight of light traveling through each of them is equal, or may be sized and dimensioned to provide different times of flight. The increase in time of flight introduced by short delay line 91 is substantially less than that of long delay lines 83 and 87.

Figure 3:
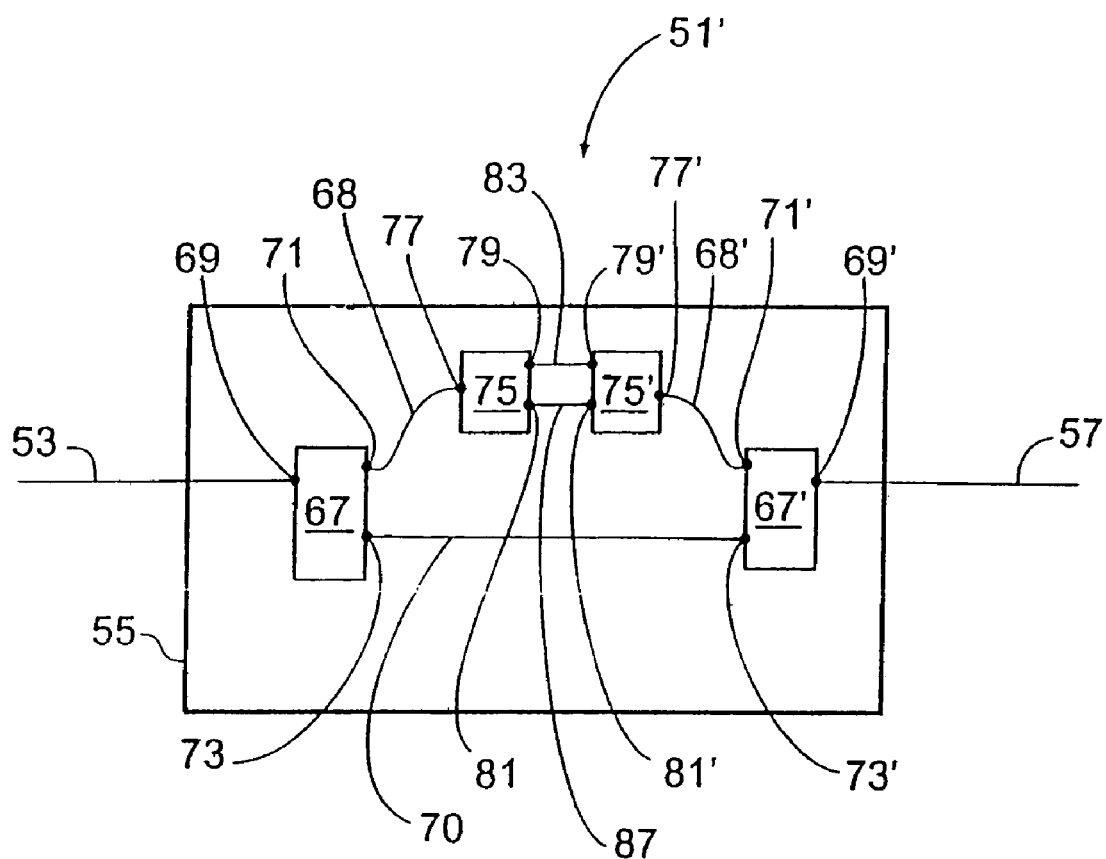
FIG. 3 is a schematic view of a third apparatus in accordance with an embodiment of the invention.

FIG. 3 provides a schematic of an alternative apparatus 51' that is functionally similar to the apparatus 51 of FIG. 2 except that light flows through the apparatus rather than being internally reflected. The apparatus 51' includes an input optical fiber 53, a body 55 and an output optical fiber 57. The input optical fiber 53 is optically coupled to a first port 69 of a three port splitter 67, and the output optical fiber 57 is optically coupled to the third port 69' of a three port splitter 67'. The splitter 67 includes three ports 69, 71, and 73, wherein light traveling into the splitter 67 through the port 69 is split between the ports 71 and 73. The splitter 67' includes three ports 69', 71', and 73', and light traveling into the splitter 67' through the ports 71' and 73' is combined and exits the splitter 67' via the port 69' and subsequently exits the apparatus 51 via the output optical fiber 57. Port 71 of splitter 67 is optically coupled to a WDM 75, and port 73 to short delay line 70. The WDM 75 includes three ports 77, 79, and 81, wherein light traveling into the WDM 75 through the port 77 is split by wavelength between the ports 79 and 81. The WDM 75' also includes three ports, 77', 79', and 81', and light traveling into the WDM 75' through the ports 79' and 81' is combined and exits the WDM 75' via the port 77', passes through splitter 67', and subsequently exits the apparatus 51' via the output optical fiber 57. The pairs of ports 79 and 79', and 81 and 81' are each connected together by a length of optical fiber (83, 87) with each length of optical fiber (83, 87) being a long delay line. The long delay lines 83 and 87 may be sized and dimensioned such that the time of flight of light traveling through each of them is equal, or may be sized and dimensioned to provide different times of flight. The increase in time of flight introduced by short delay line 91 is substantially less than that of long delay lines 83 and 87.

In some instances, the apparatus of FIG. 3 may be a compensating interferometer includes a body 55, an optical input 53, an optical output 57, at least two primary legs 68 and 70, at least two secondary legs 83 and 87, and at least two wavelength division multiplexers (WDMs) 75 and 75'. The at least two primary legs 68 and 70, at least two secondary legs 83 and 87, and at least two WDMs 75 and 75' are positioned within the body 55 which isolates the at least two primary legs 68 and 70, and the at least two secondary legs 83 and 87 from environmental changes occurring external to the body 55. Light entering the optical input 53 is split between the primary legs 68 and 70. Light entering the primary leg 68 is split between the secondary legs 83 and 87 by WDM 75 such that light split into leg 83 differs in wavelength from light split into the leg 87. Light split into each the legs 83 and 87 is recombined by the WDM 75'.

Light recombined by the WDM 75' is recombined with light split into the primary leg 70, and then exits the apparatus via the optical output 57.

As can be seen by comparing the apparatus 51 of FIG. 2, and the apparatus 51' of FIG. 3, splitting an optical signal into narrower bandwidth (preferably single wavelength) component signals, and using different delay lines for each component signal in order to reduce detrimental effects is applicable to apparatus where light is reflected back through a delay line (thereby doubling the time of flight and decreasing the necessary length of fiber required to obtain a desired time of flight), and to apparatus where light flows through the apparatus.

Both the number of optical legs and the number of optical legs comprising long delay lines may vary between embodiments. The number of long delay lines in a particular embodiment may be related to the number of WDMs used in that embodiment, and the number of component signals output by such WDMs.

The actual type of WDM used may vary between embodiments. As such, any WDM that functions to divide a signal into component signals on the basis of wavelength may be used. However, it is contemplated that at least some embodiments will comprise one or more bi-directional fused fiber WDMs Some embodiments may include more than one input and/or more than one output. In such instances, individual inputs may have corresponding outputs that are independent of any other inputs and outputs. One mechanism for achieving such independence is to combine two apparatus such as the apparatus 1 of FIG. 1 and the apparatus 51 of FIG. 2 in a single body. In other instances, inputs may be combined to generate one or more outputs. As such, inputs and outputs may be mixed and matched in any manner that produces the desired outputs.

Although the apparatus shown include optical fibers, any other form(s) of optical waveguide(s) may be used to replace any single optical fiber or combination of the optical fibers described herein with corresponding changes being made to any other components affected.

Although the apparatus shown utilize a coupler or a circulator in combination with a WDM for internal routings, any suitable internal routing mechanism that results in the desired frequency division between delay paths may be used.

Although shown with inputs suitable for being spliced to other optical fibers, the inputs and/or outputs may be replaced with any other optical connection mechanism that facilitates use of the apparatus. Some such mechanisms include but are not limited to optical colimaters or other lensing mechanism, non-fiber optical waveguides, and/or free space. Moreover, any inputs and/or outputs may be connected to one or more filters, isolators, and/or attenuators to provide additional control over the input and/or output light.

Although shown in a single housing/body, different embodiments may utilize multiple housings, or no housings at all. In some embodiments, however, housings 5 and 55 will include mechanical protection for the device including pressure, thermal, vibration and other control packaging to isolate components from environmental changes occurring outside the housing/body. The term "environmentally isolated" is used herein to describe components positioned within a body or other packaging that isolates them from environmental changes. As such, the legs of FIGS. 1 and 2 are environmentally isolated because they are positioned within housings 5 and 55. Although the size, dimensions, and construction of housings will likely vary between embodiments, it is contemplated that in many instances it will be advantageous to have a housing that would fit within a sphere having a diameter of D meters where D is one of 1, 0.5, and 0.25.

The apparatus described herein has particular application when used in conjunction with an input light source that is located substantially far from the apparatus. As an example, a light source comprising a broad band source or one with a narrow band laser source may be coupled to an apparatus, such as apparatus 1, by an optical fiber that covers an optical distance of 10 meters to 100 km, and/or where the time of flight is at least 100 ns.

In one such application, a compensating interferometer (CI) having light split between legs at least partially based on frequency can be used to tune pulses provided by the light source where the CI is located kilometers from the light source. If the light source transmits a pulse of laser light down a connecting fiber to a destination system, the connecting fiber will add coherent noise to the transmitted pulse and, if a CI is not used, degrade the performance of the destination system that the pulse is being transmitted to. By placing a CI next to the destination system, the CI can be used to reduce, and in some cases eliminate, the coherent noise added by the connecting fiber. Additionally, the CI can also be used to provide additional control over light entering the destination system such that the number of pulses and the shape of the input optical waveform is better suited for use by the destination system than the light received by the CI.

Figure 4:
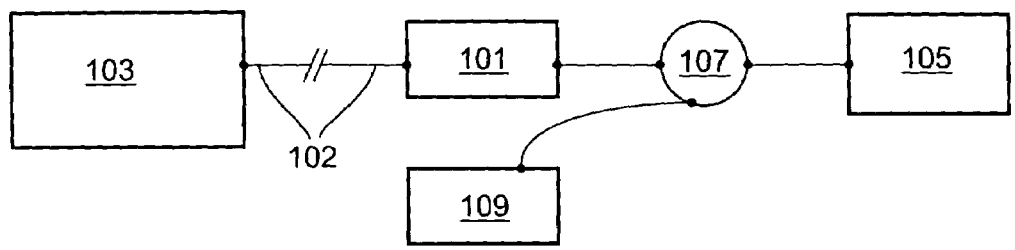
FIG. 4 is a schematic view of a first system comprising a compensating interferometer in accordance with an embodiment of the invention.
Figure 5:
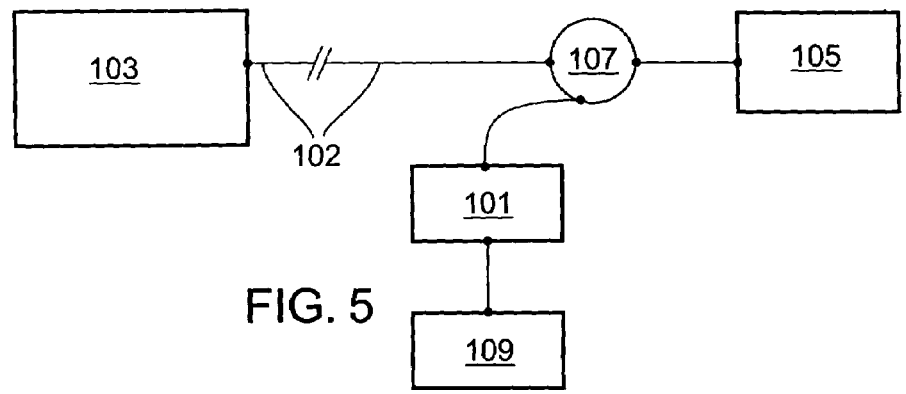
FIG. 5 is a schematic view of a second system comprising a compensating interferometer in accordance with an embodiment of the invention.
Figure 6:
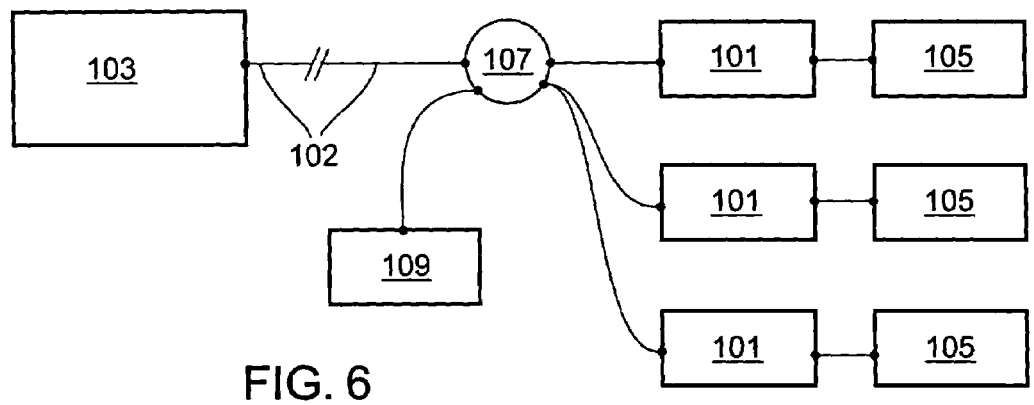
FIG. 6 is a schematic view of a third system comprising a compensating interferometer in accordance with an embodiment of the invention.

Such an application is illustrated by the apparatus of FIG. 4 in which a compensating interferometer 101 as described is coupled to a source 103 by a connecting fiber 102 so as to position CI 101 between source 103 and a splitter 107. Light entering splitter 107 from CI 101 is directed to one or more fiber optic sensor arrays or other destination systems 105, and after returning to splitter 107, is directed to one or more processing systems 109. FIGS. 5 and 6 show alternate apparatus in which CI 101 is positioned between splitter 107 and processing systems 109, and between splitter 107 and fiber optic sensor arrays 105. When positioned as shown in FIG. 5, the CI 101 can be used to clean up the output generated by the fiber optic sensor arrays 105 prior to processing by systems 109. When positioned as shown in FIG. 6, each CI 101 can be used to tune inputs for a separate fiber optic sensor array 105.

The embodiments of the present invention described herein include multiple novel features with each described embodiment including either a single such feature or a combination of such features. Other contemplated embodiments include all combinations of one or more such novel features not explicitly described herein as such combinations are readily discernable from the embodiments described. In light of the various contemplated embodiments, the present invention can be characterized in a number of ways with the following paragraphs providing examples of some such characterizations.

An instance of an embodiment of the present invention can be characterized as an apparatus including a device comprising: a body, an optical input, an optical output, and at least three optical legs; wherein a first of the at least three optical legs and a second of the at least three optical legs are substantially equal in length and longer than a third of the at least three optical legs; each leg of the at least three optical legs comprises a reflector; the at least three optical legs are positioned within the body; the input, output, legs, and reflectors are optically coupled and positioned relative to each other such that light entering the optical input is split between the legs, and at least a portion of the light in each leg travels through the leg to the leg's reflector and is reflected back through the leg, and the reflected back portions of light of the two optical legs are combined and exit the apparatus via the optical output; and light split into to the first optical leg differs in wavelength from light split into the second optical leg. In some such instances the invention may be characterized as including and/or satisfying at least one of the following elements and/or recitations: (a) the apparatus consists essentially of the device and the device is a compensating interferometer; (b) the body isolates the at least three optical legs from environmental changes occurring external to the body; (c) the apparatus comprises a wavelength division multiplexer for splitting light between the first and second optical legs; (d) the apparatus is adapted to convert an input pulse comprising a plurality of frequencies into at least two output pulses separated in time, each output pulse comprising substantially the same set of frequencies as any other output pulse; (e) the device is a compensating interferometer; (f) the first optical leg and the second optical leg each comprise at least one Bragg grating; (g) the at least one Bragg grating is a fiber Bragg Grating; (h) the first optical leg comprises a first fiber Bragg grating, the second optical leg comprises a second fiber Bragg grating, and the first and second fiber Bragg gratings have different center wavelengths and/or bandwidths; (i) the apparatus comprises a wavelength division multiplexer splitting light between the legs; (j) at least one leg comprises a reflector that is not a Bragg grating.

An instance of an embodiment of the present invention can be characterized as a method of reducing noise when transmitting a light signal comprising: dividing a primary light signal into component signals, each component signal having a narrower bandwidth than the primary light signal; transmitting at least some of the component signals through different optical waveguides; and recombining the component signals to reproduce the primary light signal. In some such instances the invention may be characterized as including and/or satisfying at least one of the following elements and/or recitations: (a) each of the different optical waveguides is an optical leg comprising a reflector, and transmitting a component signal through the optical leg comprising having light enter the leg at a first point and exit the leg at the same point after being at least partially reflected by the reflector; (b) the reflector is a Bragg grating; (c) the reflector is a fiber Bragg grating; (d) the input waveform is a pulse train and the output waveform is a pulse train and each input pulse corresponds to a plurality of output pulses separated in time.

What is claimed is:

1. An apparatus comprising:
   a body; having an optical input; and an optical output;
   a wavelength division multiplexer positioned within the body and optically connected to the optical input and the optical output;
   a first optical leg, having a first reflector, positioned within the body and optically connected to the wavelength division multiplexer,
   a second optical leg, having a second reflector, positioned within the body and optically connected to the wavelength division multiplexer; and
   a third optical leg, having a third reflector, positioned within the body and optically connected to the optical input and the optical output
   wherein a light entering the optical input of the body is split into a first light portion entering the wavelength division multiplexer and a second light portion entering the third optical leg,
   the first light portion entering the wavelength division multiplexer is further split into a third light portion entering the first optical leg and a fourth light portion entering the second optical leg, the fourth light portion having a different wavelength than the third light portion,
   the third light portion entering the first optical leg is reflected by the first reflector back through the wavelength division multiplexer as a reflected third light portion,
   the fourth light portion entering the second optical leg is reflected by the second reflector back through the wavelength division multiplexer as a reflected fourth light portion and is combined with the third reflected light to form a reflected first light portion,
   the second light portion entering the third optical leg is reflected by the third reflector as a second reflected second light portion,
   the reflected first light portion and the reflected second light portion being combined and exiting the body at the optical output.

2. The apparatus of claim 1 wherein the first optical leg further comprises a first optical fiber, the second optical leg further comprises a second optical fiber, and the third optical leg further comprises a third optical fiber, and further wherein the first optical fiber and the second optical fiber are substantially equal in length and longer than the third optical fiber.

3. The apparatus of claim 2 wherein the body isolates the at the first optical leg, the second optical leg, and the third optical leg from environmental changes occurring external to the body.

4. The apparatus of claim 3 wherein the apparatus is adapted to convert an input pulse comprising a plurality of frequencies into at least two output pulses separated in time, each output pulse comprising substantially the same set of frequencies as any other output pulse.

5. The apparatus of claim 3, wherein:
   the first optical leg and the second optical leg each comprise at least one Bragg grating.

6. The apparatus of claim 5 wherein the at least one Bragg grating is a fiber Bragg Grating.

7. The apparatus of claim 6 wherein the first optical leg comprises a first fiber Bragg grating, the second optical leg comprises a second fiber Bragg grating, and the first and second fiber Bragg gratings have different center wavelengths and/or bandwidths.

8. The apparatus of claim 1 wherein at least one leg comprises a reflector that is not a Bragg grating.

9. The apparatus of claim 3 wherein the environmental changes occurring external to the body comprises pressure and thermal changes.

10. The apparatus of claim 9 wherein the environmental changes occurring external to the body further comprises vibration changes.

11. The apparatus of claim 9 wherein the body has a diameter less than 1 meter.

12. The apparatus of claim 9 wherein the body has a diameter less than 0.5 meters.

13. The apparatus of claim 9 wherein the body has a diameter less than 0.25 meters.

* * * * *